United States Patent [19]
Wuerthner

[11] Patent Number: 5,832,590
[45] Date of Patent: Nov. 10, 1998

[54] SYSTEM FOR MACHINING WORKPIECES

[76] Inventor: Holger Wuerthner, Esslinger Strasse 23, D-78054 Villingen-Schwenningen, Germany

[21] Appl. No.: 694,197

[22] Filed: Aug. 8, 1996

[30] Foreign Application Priority Data

Aug. 8, 1995 [DE] Germany ............. 195 29 071.2

[51] Int. Cl.⁶ ................. B23Q 7/02; B23B 9/00
[52] U.S. Cl. ................. 29/563; 29/27 R; 29/36; 29/564; 82/119; 82/129
[58] Field of Search ............ 29/563, 564, 38 A, 29/38 B, 38 R, 27 R; 82/129, 119, 120

[56] References Cited

U.S. PATENT DOCUMENTS

| | | | |
|---|---|---|---|
| 4,457,193 | 7/1984 | Matthe | 29/36 X |
| 4,612,832 | 9/1986 | Ushigoe et al. | 82/129 |
| 5,115,546 | 5/1992 | Mitsukuchi et al. | 29/27 C |
| 5,117,544 | 6/1992 | Kousaku et al. | 29/27 C |
| 5,239,901 | 8/1993 | Lin et al. | 82/119 |

FOREIGN PATENT DOCUMENTS

| | | | |
|---|---|---|---|
| 552592 | 7/1993 | European Pat. Off. | 29/563 |
| 2804584 | 8/1979 | Germany | 29/563 |
| 1284788 | 1/1987 | U.S.S.R. | 29/563 |
| 788113 | 12/1957 | United Kingdom | 29/563 |
| 94016860 | 8/1994 | WIPO | 29/563 |

*Primary Examiner*—William R. Briggs
*Attorney, Agent, or Firm*—Eugene E. Renz, Jr., P.C.

[57] ABSTRACT

A system for performing machining operations on different portions of workpieces comprising a plurality of workstations including a lathe disposed along a predetermined path, in the present instance, a circular path. A turntable supports a plurality of workpiece chucking devices equi-spaced circumferentially around the turntable. The turntable rotates relative to the workstations to position a workpiece chucking device at each workstation permitting different machining operations to be performed on workpieces simultaneously. The chucking devices are moveable on the turntable in a radial direction to present the workpieces to the various tools at the workstations. The workpiece chucking devices include spindle motors and means for synchronizing the speeds of the spindle motors of the chucking devices with the lathe motor.

6 Claims, 3 Drawing Sheets

SYSTEM FOR MACHINING WORKPIECES

FIELD OF THE INVENTION

The present invention relates to an improved method and system for performing various machining, turning, milling or other required operations on the ends of parts or workpieces in mass production applications.

BACKGROUND OF THE INVENTION

Various devices for use in mass production applications are not new. In the device described in German Patent Number DE 1,264,927, for example, various chucks or chucking devices, which rotate around their axes, are mounted equal distances apart on a turntable. In this particular invention, all of the chucking devices are mechanically coupled by a common central shaft consisting of a universal joint propeller shaft and bevel gear drive. All of the chucking devices are, therefore, driven at the same speed, and the speed at which the devices rotate is synchronized with the speed of an automatic lathe installed opposite the turntable. After one end of the part or workpiece has been machined, the workpiece or part chucked in the automatic lathe is picked off. After the turntable has been advanced a step, it is possible to machine the opposite end of the workpiece at the same rotational speed as a workpiece which is chucked at two subsequent machining stations. To remove the workpieces from the automatic lathe, a slide, carrying the turntable, moves it to the correct position. Because all of the chucking devices are driven at the same speed, however, during the time it takes to move the turntable back and forth, it is not possible to machine workpieces in the other machining stations. In addition to this particular disadvantage, moving the entire turntable and slide assembly is a relatively clumsy and, therefore, a complicated process. In addition to this disadvantage, because all of the workpieces in the chucking devices on the turntable rotate at the speed of the automatic lathe, the unfinished ends of these parts can only be machined while the part is rotating. No other machining processes can be performed on these rapidly rotating parts.

The device disclosed in German Patent Number DE 936,176 is also of interest. This patent discloses workpiece chucking devices mounted on a turntable in such a way that the devices may slide in the radial direction but do not rotate around their axes. As a consequence, machining operations can only be carried out while each individual workpiece is stationary. To machine the unfinished end of a workpiece, a second turntable, which can be advanced in steps, is required to perform the necessary operations. This makes the overall device quite complicated.

Given the limitations discussed above, the art would be improved by a method and system designed to allow desired machining processes to fabricate the ends of workpieces both when the workpieces are rotating as well as when they are stationary with a minimum loss of machining time. This would simplify the manufacturing process.

To address the limitations of the prior art, the present invention utilizes a plurality of chucking devices designed as spindle motors. The spindle motors are mounted equidistant from each other on the circumference of a turntable. The invention also provides a means for reversing each workpiece to permit operations on both ends. Lastly, the invention provides a means for coordinating the speed of each chucking device with a lathe to allow for machining operations both when the workpiece or part is rotating and as well as when it is stationary.

SUMMARY OF THE INVENTION

The objects of the present invention, i.e, the improvements over the prior art, are accomplished as follows:

The workpiece chucking devices are designed as pick-off spindle motors which can slide in the radial direction of the turntable. Each individual pick-off spindle motor is adaptively controlled, and when these motors are used together with an automatic lathe, the rotational speed of each motor may be synchronized with that of the lathe. The rotational speed of the chucking devices at each workstation can be adjusted to the machining process to be performed at that station. The chucking devices may be kept stationary if necessary. Thus, the limitations of the prior art are overcome in an extremely simple manner.

The claims are directed towards several preferred embodiments of the invention. One preferred embodiment, shown in the drawings and described in greater detail, permits one end of a workpiece to be subjected to machining operations outside the axis of rotation, such as drilling, transverse drilling, milling, or thread-cutting, while the workpiece is stationary. By means of another preferred embodiment, also described in detail, a part reversing station allows the turned end of a workpiece to be machined on the turntable while the workpiece is stationary. This operation can be accomplished without turning off the automatic lathe and waiting for it to come to a complete stop.

The device according to the invention offers the following advantages over the state of the art:

1. By advancing the synchronized pick-off spindle motor located opposite the automatic lathe, a turned part, which has been machined on the lathe in a very short time (about 3 seconds), may be removed in the correct position for subsequent operations. The opposite end of the part may be machined in many different ways in at least one, or preferably several, e.g., three to eight or even more, workstations which are located around the turntable.

2. An extremely short turned part removal cycle is achieved by utilizing a pick-off spindle motor, which is moved forward or backward in an axial direction in a very short period of time by hydraulic, pneumatic, or electrical means. The ultra-fast turned part pick-off process makes it possible for the unfinished end of the turned part to be machined very rapidly.

3. Each of the sliding, synchronized spindle motors, which can be indexed on the turntable, functions in turn as pick-off spindle motor, depending on which of the various positions it occupies on the advanceable turntable. Thus, in addition to machining spindle motors on the turntable, there will always be a parts ejector spindle motor and a pick-off spindle motor on the turntable as well.

4. The machining cycle time depends upon the time required to machine the turned parts, the spindle motor pick-off time, and the turntable indexing time (forward feed time). The total part cycle time always depends on the longest machining cycle.

5. By using spindle motor pick-off devices, the turned parts may be removed in very short unit machining times (about 3 seconds) in their proper position for additional operations. Thus, even very small quantities of parts can be machined completely at low cost.

6. As a result of the speed-controlled spindle motors, which can be indexed on the turntable, it is possible to complete even complicated machining processes on the unfinished end of turned parts simply by providing the various workstations with appropriate tools.

7. The spindle motor pick-off device turning center can be built as a low-cost, station device to manufacture simple turned parts, which are machined at the unturned end, and also as complicated, multi-station, complete machining/ turning centers with a relatively large number of workstations set up around the turntable.

8. Utilizing the pick-off spindle motor to remove the turned part effectively readies each part for additional operations to be performed on the cut end of the turned part. Mounting a part reversing station on the turntable avoids the need to stop the automatic lathe spindle when a previously turned part is subjected to machining processes which can only be carried out when the turned part is stationary, e.g., operations such as drilling at points outside the center of the rotational axis, transverse drilling, milling, thread-cutting, etc.

9. The time required for indexing or advancing the turned part can be exploited to slide the pick-off spindle motor back and then forward again to the next workstation or to the part ejection station. This permits each workpiece or part to be rapidly advanced to the next workstation.

BRIEF DESCRIPTION OF THE DRAWINGS

These and other objects of the present invention, together with the various features of the system and its operations, are hereinafter more fully set forth with reference to the accompanying drawings where.

DETAILED DESCRIPTION OF THE PREFERRED EMBODIMENTS

Figure 1:
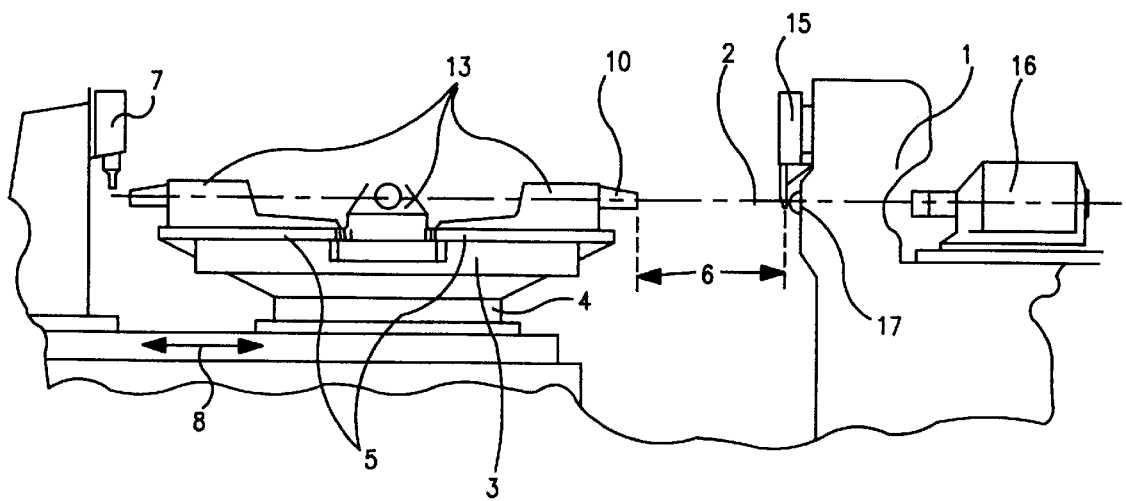
FIG. 1 is a schematic diagram of the side of one preferred embodiment of the invention showing the slide which permits the turntable to accommodate long workpieces.

As shown in FIG. 1, a turntable (3) is mounted on turntable base (4) which in turn is mounted on a sliding mechanism allowing the turntable to move a certain adjustment distance (8) towards and away from the automatic lathe (1). The sliding feature permits the turntable to move a certain distance (6) towards and away from the automatic lathe to accommodate long workpieces. FIG. 1 also shows the spindle motor (16) for the automatic lathe, the automatic lathe (1) and the toolholder (15), which holds the appropriate tools to turn stock material and cut it to proper length. Also shown in FIG. 1 are roller guideways (5) to carry spindle motor (13) towards and away from the workstations.

Figure 2:
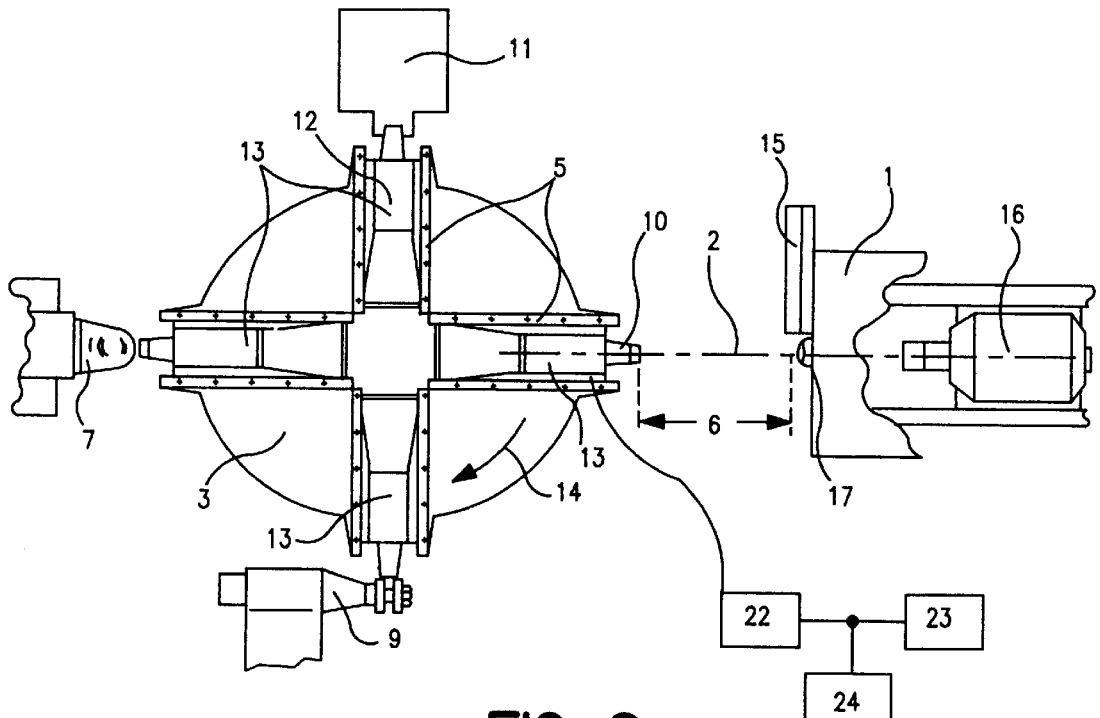
FIG. 2 is an overhead view of the invention shown in FIG. 1 showing the chucking devices mounted on the turntable at equal distances from each other, a lathe, two workstations, and a part ejection station.

FIG. 2 shows four spindle motors (13), which hold the workpieces during the machining operations, and roller guideways (5) mounted on turntable (3). The spindle motors are mounted on the turntable at equal distances from each other, so that separate machining operations can be performed at various workstations simultaneously. In addition, FIG. 2 shows several workstations (7) and (9) for performing operations such as grinding or drilling the unturned end of the workpiece, and part ejection station (12) where finished parts are ejected into a container or similar collecting apparatus (11).

Figure 3:
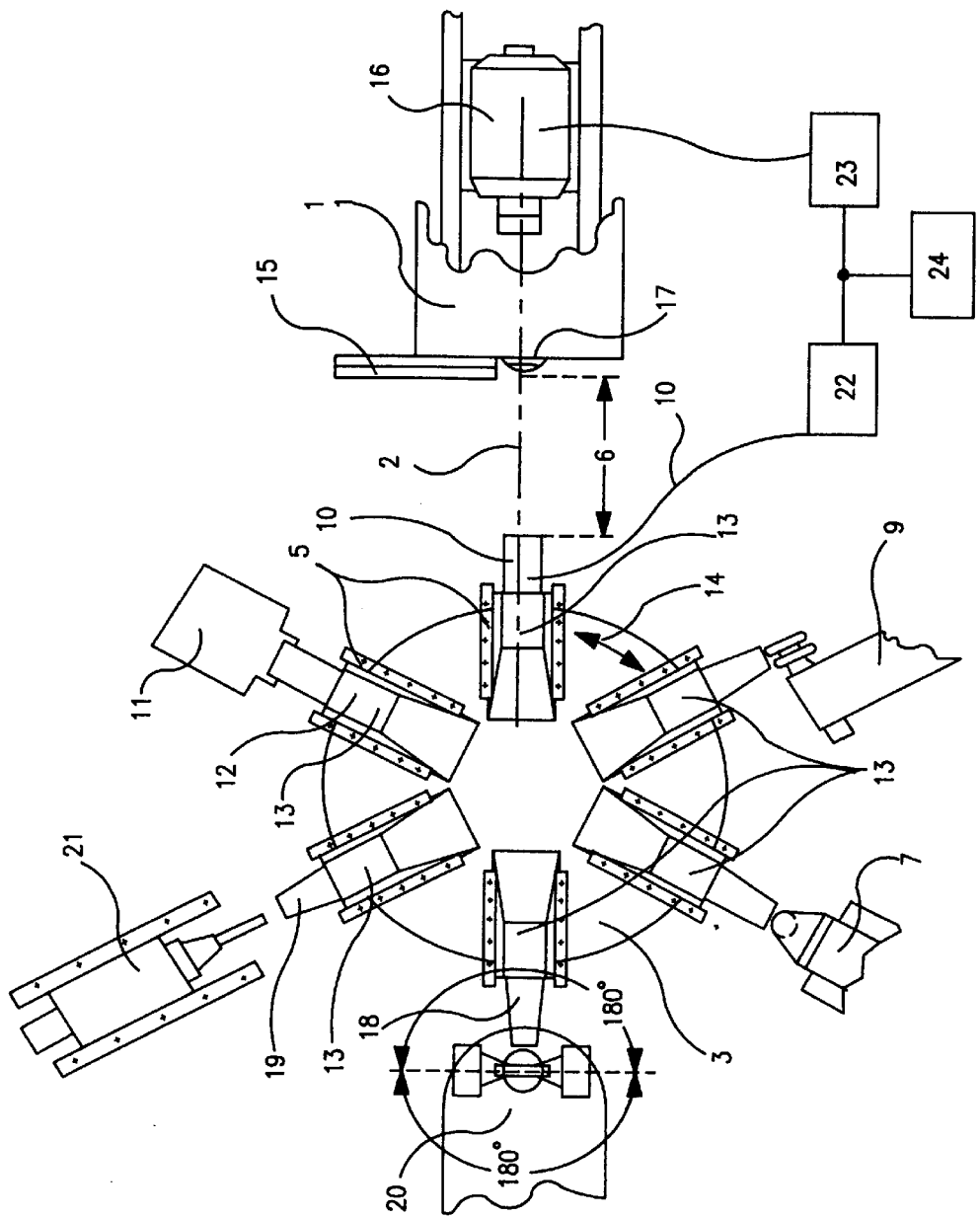
FIG. 3 is another overhead view, generally corresponding to that of FIG. 2, showing chucking devices arrayed on the turntable, several workstations, the part ejection station, the coordinated control system, and the part reversing station.

FIG. 3 shows turntable (3) and the same turning and workstations as FIG. 1. FIG. 3 also shows electronic control units (22) and (23), a coordinating control unit (24), and part reversing station (20).

The system as shown in FIGS. 1 and 2 works the following way:

Stock material is inserted into automatic lathe (1) which fabricates a turned part (not shown) or workpiece in the lathe barrel (17) by means of tools attached to tool holder (15). It takes only about three seconds for a part or workpiece to be turned, at which point the part is cut off. Spindle motor (13), the rotational speed of which is synchronized with that of automatic lathe spindle motor (16), is located at pick-off spindle location (10) to remove the part or workpiece from the lathe. The pick-off spindle position is in precise linear alignment with the axial center (2) of the automatic lathe. Spindle motor (13) in pick-off position (10) is pushed hydraulically, pneumatically, or electrically over the turned part produced on automatic lathe (1) by a certain distance (6). A chucking device (collet chuck) holds the turned part in spindle motor (13). After the turned part has been subjected to the cut-off operation in automatic lathe (1), spindle motor (13), together with the turned part in the chucking device, is retracted by a certain distance (6) back to its starting position near the center of turntable (3) and, simultaneously with that, to save time, turntable (3) is rotated to the first workstation (9) to machine the unturned end as needed. This brings an empty speed synchronized pick-off spindle motor opposite automatic lathe (1) into pick-off position (10) to accept another turned part from automatic lathe (1).

While a second part is being turned on automatic lathe (1), the first part, previously turned on the lathe and then rotated to the first workstation (9), may be machined while spindle motor (13) is stopped.

When the part pick-off process for the second turned part in position (10) has been completed, turntable (3) is again advanced by one station bringing the first turned part to the second machining station (7) for additional machining operations, and the second turned part to the first workstation (9). Spindle motors (13) are thus sequentially advanced from automatic lathe (1) to the first workstation (9), and thereafter to the second workstation (7) for completion of additional machining operations on the unturned end of each part or workpiece.

After a third turned part has been finished on automatic lathe (1) and picked off by the spindle motor at pick-off station (10), turntable (3) is again advanced by one station. The first turned part or workpiece is now in finished part ejection position (12) where it is ejected into finished part container (11) or a similar collection apparatus and the second and third parts are in workstations (7) and (9). The spindle motor (13) at part ejection station (12) is now empty, and, shortly after a fourth turned part is brought by turntable (3) back into pick-off spindle position (10), the turntable is advanced once again in forward-advance direction (14) and the sequence of operations described above begins again and continues in an endless cycle.

The spindle motors (13) are mounted in roller guideways (5) on turntable (3) so that each can be moved with precision and low resistance, and thus with extreme speed, over pick-off distance (6). It should be noted that, in FIG. 1, workstation (9) has been omitted for the sake of clarity. To machine extremely short or long turned parts, the entire turntable unit can be shifted along adjustment distance (8) on the longitudinal axis of the lathe.

The preferred embodiment illustrated in FIG. 3 differs from the embodiment shown in FIGS. 1 and 2 in that, in addition to workstations (9) and (7), and finished part ejection station (12), which are visible in FIG. 2, part reversing station (20) and workstation (21) are shown on turntable (3), spaced at uniform angular distances of 60°. In each station, spindle motor (13) is supported in the same manner described above.

Part reversing station (20) is provided when a transverse machining operation on the turned end of a part or workpiece is required. In such a case, it is not necessary to stop spindle motor (13) of automatic lathe (16). At spindle position (18), the workpiece is removed from spindle motor (13) and inserted in part reversing device (20). After part reversing device (20) is rotated 180°, the part or workpiece (not shown) is inserted back in spindle motor (13) in spindle position (18). The next time turntable (3) is advanced a step, the part or workpiece, thus reversed, together with its pick-off spindle motor (13), arrives at workstation (21). In this position, the turned end of the part of workpiece can be machined, e.g., drilled, milled, turned, etc.

In the preferred embodiments according to FIGS. 1, 2 and 3, the speed of automatic lathe spindle (16) is synchronized with that of pick-off spindle motor (13) in position (10), by means of an electronic control unit coordinator (24), which synchronizes electronic control unit (22) for pick-off spindle motor (13), with electronic control unit (23) for automatic lathe spindle motor (16).

Figure 4:
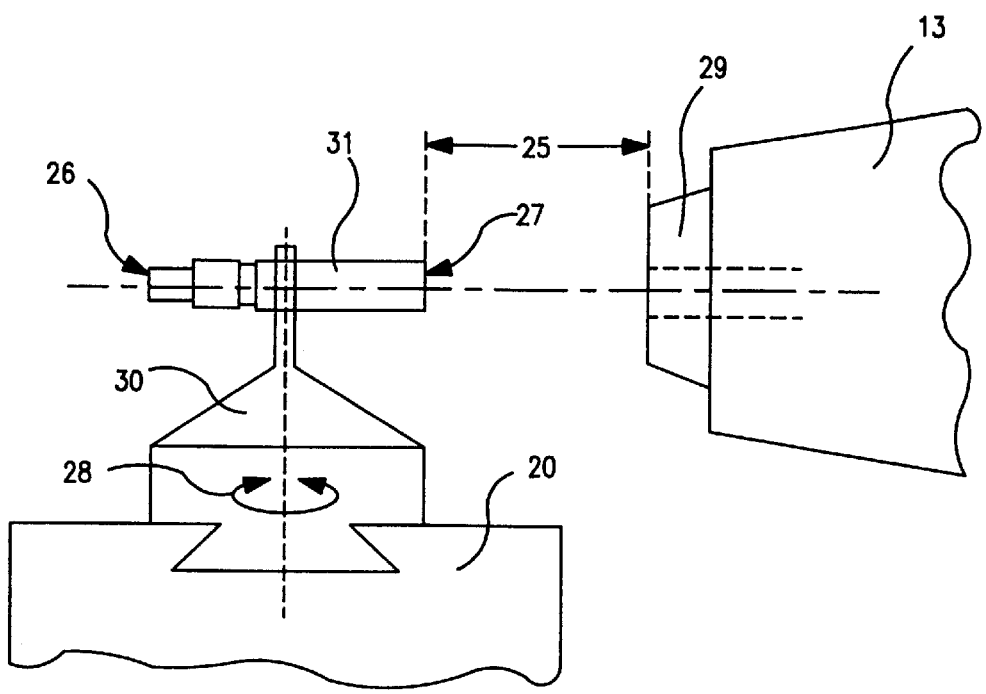
FIG. 4 is a schematic diagram showing the side of the part reversing station shown in FIG. 3 with a part or workpiece in place.
Figure 5:
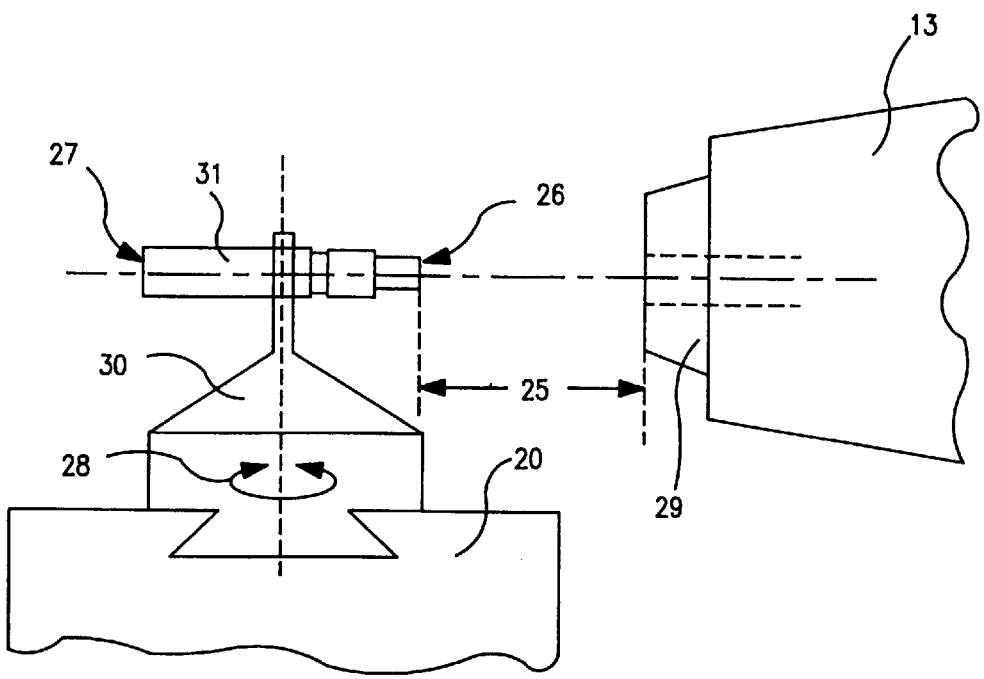
FIG. 5 is the part reversing station illustrated in FIG. 4 with the part or workpiece rotated 180° from the position shown in FIG. 4.

The means by which part reversing station (20) functions can be derived from FIGS. 4 and 5. Twin-jaw gripper (30) removes workpiece or turned part (31) from collet chuck (29) of spindle motor (13), in a manner not shown in detail, over pick-off distance (25). Twin-jaw gripper (30) is pivoted 180° in the direction of double arrow (28) into the position shown in FIG. 5. In this position, turned end (27) of workpiece (31) faces away from collet chuck (29), and machined end (26) of workpiece (31) is ready for axial insertion into collet chuck (29) over insertion distance (25). After workpiece (31) has been inserted with the machined end (26) in collet chuck (29), twin-jaw gripper (30) is removed from workpiece (31). Turntable (3) advances another step bringing workpiece (31) to workstation (21), where turned end (27) of workpiece (31) can be machined. Twin-jaw gripper (30) can be moved in a direction perpendicular to the longitudinal axis of the workpiece by pneumatic devices (not shown). The part reversing station (20) is designed to be rotatable and axially movable.

The entire sequence of machining operations of the embodiments illustrated in FIGS. 3–5 is as follows:

Turned end (27) of workpiece (31) is machined at pick-off station (10). At workstations (9) and (7), various operations are performed successively on the machined end (26) of workpiece (31), preferably while spindle motor (13) is stationary. In spindle position (18), the above-described 180° reversal of workpiece (31) is executed at part reversing station (20). At workstation (19), a last machining operation is performed on turned end (27) of the workpiece. In a final step, the finished workpiece arrives at part ejection position (12) and is ejected into a finished part container (11) or similar collection apparatus. The entire machining cycle begins again at pick-off spindle position (10), where the spindle speed of pick-off spindle motor (13) is synchronized with the speed of automatic lathe spindle (16).

What is claimed is:

1. A system for performing machining operations on workpieces comprising:

a plurality of workstations including a lathe having a motor disposed along a predetermined path;

means including a plurality of workpiece chuck devices for presenting workpieces at various workstations in a manner to permit different machining operations to be performed on workpieces simultaneously;

means mounting said workpiece chuck devices for translation movement including workpiece motors; and means for synchronizing the speeds of the workpiece chuck device motors and lathe motor.

2. A system as claimed in claim 1, wherein the speeds of the motors are AC-controlled with respect to the workstations.

3. A system as claimed in claim 1, including hydraulic means for moving said chuck devices toward and away from said workstation.

4. A system as claimed in claim 1, including pneumatic means for moving said chuck devices toward and away from said workstation.

5. A system as claimed in claim 1, including electric means for moving said chuck devices toward and away from said workstation.

6. A system as claimed in claim 1, including a reversing station to rotate workpieces for selectively changing the portion of a workpiece presented to the workstation.

* * * * *